United States Patent Office 2,894,964
Patented July 14, 1959

2,894,964

9,12-DIKETO-10-HYDROXYSTEARIC ACID AND METHOD FOR PREPARING SAME

Joseph Nichols, Princeton, and Edgar S. Schipper, Highland Park, N.J., assignors to Ethicon, Inc., a corporation of New Jersey No Drawing. Application July 18, 1957
Serial No. 672,548

9 Claims. (Cl. 260—406)

This invention relates to 9,12-diketo-10-hydroxystearic acid and salts thereof and has among its objects the provision of such compounds and a process for their production.

U.S. Patent No. 2,623,888, December 30, 1952, discloses the preparation of 12-ketooleic acid and its cis-trans isomer 12-ketoelaidic acid and esters thereof, by the oxidation of the 12-hydroxy group to the 12-keto group of ricinoleic acid and ricinelaidic acid and their esters by means of chromic acid, preferably in the presence of sulfuric acid, all reactants being in solution in glacial acetic acid.

U.S. Patent No. 2,623,889, December 30, 1952, discloses that a diketo octadecenoic acid may be prepared by the oxidation of 12-ketooleic acid and 12-ketoelaidic acid and esters thereof with excess chromic acid in glacial acetic acid solution containing sulfuric acid, the amount of chromic acid being in excess of that required to oxidize a methylene group in the molecule, approximately 400% excess being preferred for optimum yields.

It has now been discovered that 9,12-diketo-10-hydroxystearic acid having the formula

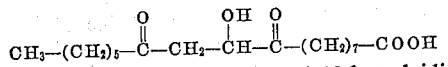

may be prepared by the oxidation of 12-ketoelaidic acid with oxidizing agents such as potassium permanganate in basic solution, or hydrogen peroxide in an organic solvent in the presence of a catalytic amount of osmium tetroxide.

For the purpose of illustrating this invention, Examples 1 and 2 are given below in order to show the methods of preparing 9,12-diketo-10-hydroxystearic acid by the oxidation of 12-ketoelaidic acid. It is to be understood that these examples are set forth by way of illustration and not by way of limitation.

Example 1

A solution of 5.3 grams of potassium permanganate in 333 milliliters of water was added dropwise to a stirred solution containing five grams of 12-ketoelaidic acid, 1.6 grams of potassium hydroxide and 863 milliliters of water. During the course of the addition, the reaction temperature was maintained below 10° C. After the addition was complete, the reaction mixture was stirred for five minutes and then 16.6 grams of sodium bisulfite and 83 milliliters of 9-Normal sulfuric acid were added successively. A solid crystalline material separated directly from the reaction mixture. The solid was purified by recrystallization from 50 percent aqueous ethanol and the recrystallized material was again recrystallized, the solvent being a mixture of equal volumes of ethyl ether and petroleum ether having a boiling point of 30 to 60° C. 1.2 grams of the twice recrystallized product having a melting point of 90–91° C. were obtained. The carbon and hydrogen analysis gave the following results: Calculated for 9,12-diketo-10-hydroxystearic acid, $C_{18}H_{32}O_5$; carbon equals 65.82%; hydrogen equals 9.82%. Found, carbon equals 66.01% and hydrogen equals 9.73%. Molecular weight; found equals 328; calculated equals 328. Carbonyl group; found equals 17.4%; calculated equals 17.1%. Absorption measurement in the infra red showed a peak at 3.1 mu, indicating the presence of an associated hydroxyl group.

Example 2

Sixty milliliters of a reagent solution containing five percent to 5.1 percent hydrogen peroxide in anhydrous tertiary butyl alcohol and 12 ml. of one percent ethereal solution of osmium tetroxide were added to a solution of 10 grams of 12-ketoelaidic acid in 100 milliliters of anhydrous tertiary butanol. The mixture was stirred and the temperature gradually rose to 50° C. and cooling was then applied until the temperature was 35° C. The reaction mixture was stirred one hour while the temperature was maintained at 35° C. and then allowed to stand overnight at room temperature. 500 milliliters of water were added to the reaction mixture and the semi-solid material was extracted successively with two 200 milliliter portions of ethyl ether. The ether extracts were combined, washed successively with five 200 milliliter portions of water and the washed ether solution was dried over sodium sulfate and concentrated under reduced pressure until the volume was 25 milliliters. 100 milliliters of petroleum ether (boiling point 30–60° C.) were added to the concentrated ether solution and the resulting solution was cooled to −30° C. The precipitate formed upon cooling was filtered and recrystallized twice from a mixture of equal parts of ethyl ether and petroleum ether having a boiling point of 30–60° C. and then recrystallized from 50 percent aqueous ethanol. 2.5 grams of 9,12-diketo-10-hydroxystearic acid having a melting point of 90–91° C. were obtained.

9,12-diketo-10-hydroxystearic acid prepared according to Examples 1 and 2 was readily converted to 9,12-diketostearic acid by reduction with stannous chloride. 5 grams of stannous chloride, 9 milliliters of glacial acetic acid and 7 milliliters of concentrated hydrochloric acid were mixed and heated until the solution was clear. 1 gram of 9,12-diketo-10-hydroxystearic acid was added to the stannous chloride solution and the resulting solution was boiled for three minutes and poured onto ice. The precipitate which formed was washed with water and recrystallized three times from 90 percent aqueous ethanol. Nine-tenths gram of recrystallized acid having a melting point of 95–96° C. was obtained. The recrystallized acid gave no melting point depression with 9,12-diketostearic acid. The dioxime of the recrystallized acid had a melting point of 112–113° C. and gave no melting point depression with the dioxime of 9,12-diketostearic acid. 9,12-diketostearic acid is a known compound and was reported by Goldsobel, Chemisches Zeitung, 30, 825 (1906); Goldsobel, Berichte, 27, 3121 (1894).

9,12-diketo-10-hydroxystearic acid may be readily converted into a salt having substantially more solubility in water than the free acid. Salts prepared by reacting the acid with inorganic bases, such as sodium, potassium and ammonium hydroxide, as well as organic amines such as diethanolamine, triethanolamine, pyridine, and primary, secondary, and tertiary aliphatic amines in general, have solubility in water several times greater than the free acid.

As an example thereof, 328 parts of 9,12-diketo-10-hydroxystearic acid in ethyl alcohol solution were treated with 56.1 parts of potassium hydroxide in ethyl alcohol solution, yielding 366 parts of the 9,12-diketo-10-hydroxystearic acid potassium salt after removal of the solvent. This had a considerably greater solubility in water than the free acid.

When stoichiometric amounts of sodium hydroxide, ammonium hydroxide, diethanolamine, triethanolamine and pyridine are reacted with 9,12-diketo-10-hydroxystearic acid the resulting salts are formed, and these salts all have a considerably greater solubility in water than the free acid.

The novel acid 9,12-diketo-10-hydroxystearic acid, and its salts may be used for a number of different purposes in a wide variety of fields. They may be employed as intermediates in further chemical syntheses or as finished products. In the latter category, they find use in the inhibition of the growth of microorganisms, and particularly fungi and mycobacteria. As intermediates, the acid may be reacted with alcohols to make esters, or converted into amides.

For instance, the methyl ester derivative of 9,12-diketo-10-hydroxystearic acid, methyl-9,12-diketo-10-hydroxystearate, was prepared by the following procedure:

A solution of 0.75 g. of 9,12-diketo-10-hydroxystearic acid in 72 ml. of methanol containing 3 ml. of concentrated hydrochloric acid was allowed to stand 24 hours at room temperature. Most of the solvent was removed in vacuo and the residue was diluted with 100 ml. of water. The oil was extracted with 100 ml. of ether and the ether layer was washed with a 10% solution of potassium carbonate and then with water. The ether solution was dried over sodium sulfate and then the drying agent and the solvent were removed. The residue was taken up in 15 ml. of petroleum ether (B.P. 30°–60° C.) and after decolorization with animal charcoal, the solution was cooled to −30° C. The precipitate was collected and recrystallized again from petroleum ether. M.P. 45°–47° C.

| Analysis | C | H |
| --- | --- | --- |
| Calc'd for $C_{19}H_{34}O_5$ | 66.63 | 10.01 |
| Found | 66.54 | 10.02 |

*Example 3*

The compound prepared according to the foregoing examples was tested for activity against *Mycobacterium tuberculosis* H37R$_a$ according to the method of A. W. Frisch and M. S. Tarshis, American Review of Tuberculosis, vol. 64, page 551 (1951). 9,12-diketo-10-hydroxystearic acid completely inhibited the growth of *Mycobacterium tuberculosis* H37R$_a$ at a concentration of 500 micrograms per milliliter.

The compound prepared according to the foregoing examples was tested for activity against *Coccidioides immitis, Candida albicans* and *Cryptococcus neoformans* by a serial dilution method given by the following procedure:

The compound was sterilized by exposure to propylene oxide for three days and 0.25 milliliter of sterile aqueous solution containing twenty milligrams of compound per milliliter of solution was added to 4.5 milliliters of sterile Mycophil broth, the broth then being serially diluted with additional sterile broth to provide solutions of five milliliters total volume containing 1000, 500, 100, 10, 1, 0.1, and 0.01 micrograms of compound per milliliter of solution. One milliliter portions of seventy-two hour Mycophil broth cultures of *Coccidioides immitis, Candida albicans* and *Cryptococcus neoformans* were added to ninety-nine milliliter portions of sterile Mycophil broth and 0.2 milliliter portions of the diluted cultures were added to each of the serial dilutions containing the test compound and the inoculated tubes were incubated at 25° C. for five days. 9,12-diketo-10-hydroxystearic acid completely inhibited the growth of *Coccidioides immitis, Candida albicans* and *Cryptococcus neoformans* at a concentration of 1000 micrograms per milliliter.

When 9,12-diketostearic acid, prepared from 9,12-diketo-10-hydroxystearic acid as described above, was tested for activity by the method of Example 3 it was found that 9,12-diketostearic acid completely inhibited the growth of both *Mycobacterium tuberculosis* H37R$_a$ and *Mycobacterium tuberculosis* H37R$_v$ at a concentration of 100 micrograms per milliliter, and completely inhibited the growth of *Coccidioides immitis, Candida albicans* and *Cryptococcus neoformans* at a concentration of 1000 micrograms per milliliter.

This application is a continuation-in-part of our application Serial No. 439,464, filed June 25, 1954.

It is apparent that many widely different embodiments of this invention may be made without departing from the spirit and scope thereof; and, therefore, it is not intended to be limited except as indicated in the appended claims.

What is claimed is:

1. As new chemical compounds, the group which consists of 9,12-diketo-10-hydroxystearic acid and salts thereof, said salts being members of the group which consists of sodium, potassium, ammonium pyridine, diethanolamine, and triethanolamine salts of 9,12-diketo-10-hydroxystearic acid.
2. 9,12-diketo-10-hydroxystearic acid.
3. 9,12-diketo-10-hydroxystearic acid sodium salt.
4. 9,12-diketo-10-hydroxystearic acid potassium salt.
5. 9,12-diketo-10-hydroxystearic acid ammonium salt.
6. 9,12-diketo-10-hydroxystearic acid pyridine salt.
7. A method for the preparation of 9,12-diketo-10-hydroxystearic acid comprising oxidizine 12-ketoelaidic acid with a member of the group which consists of potassium permanganate in basic solution and hydrogen peroxide in the presence of a catalytic amount of osmium tetroxide.
8. A method for the preparation of 9,12-diketo-10-hydroxystearic acid comprising oxidizing 12-ketoelaidic acid with potassium permanganate in basic solution.
9. A method for the preparation of 9,12-diketo-10-hydroxystearic acid comprising oxidizing 12-ketoelaidic acid with hydrogen peroxide in the presence of a catalytic amount of osmium tetroxide.

References Cited in the file of this patent

UNITED STATES PATENTS 2,623,888   Nichols _____ Dec. 30, 1952

OTHER REFERENCES

Milas et al.: J. Am. Chem. Soc., 58, 1302–1303 (1936).
Coleman et al.: J. Am. Chem. Soc., 78, 5342–5345 (1956).